UNITED STATES PATENT OFFICE.

MATTHEW FRASER FAIRLIE AND JAMES JOHN DENNY, OF COBALT, ONTARIO, CANADA.

PROCESS OF TREATING MANGANIFEROUS ORES OF THE PRECIOUS METALS.

1,417,153.   Specification of Letters Patent.   Patented May 23, 1922.

No Drawing.   Application filed July 7, 1921. Serial No. 483,069.

*To all whom it may concern:*

Be it known that we, MATTHEW FRASER FAIRLIE and JAMES JOHN DENNY, of Cobalt, mining engineers, in the district of Temiskaming, Province of Ontario, Canada, subjects of the King of Great Britain, have invented certain new and useful Improvements in Processes of Treating Manganiferous Ores of the Precious Metals, of which the following is a specification.

At the present time the treatment of manganiferous ores of the precious metals is both difficult and expensive owing to the presence of the manganese dioxide in the ore. In the treatment of such ores it has been usual to give straight cyanide treatment which results in but poor extractions and while it has been proposed to employ preliminary reducing or chloridizing roast preparatory to the usual treatment for the recovery of the precious metals such treatment is expensive, and our object therefore is to devise a method of preliminary treatment of the ores which will be comparatively cheap, and which will enable the values to be subsequently extracted as cheaply and effectively as from ores of the same general type which do not contain oxides of manganese.

We attain our object by subjecting the ore to a preliminary wet chemical treatment, which will de-oxidize the manganese and preferably convert it into manganous sulphate.

Specifically the treatment consists in acting on the ore with sulphuric acid in the presence of metallic iron, the reaction on the manganese dioxide being substantially as shown in the following equation:—

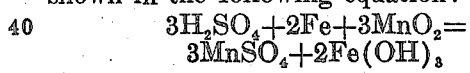
$$3H_2SO_4 + 2Fe + 3MnO_2 = 3MnSO_4 + 2Fe(OH)_3$$

The manganiferous ore containing gold or silver is first crushed to a suitable fineness and is then agitated in a suitable receptacle with sulphuric acid, water and metallic iron, preferably in the form of scrap. The iron and acid are, of course, used in suitable proportion to the manganese dioxide present as determined from the analysis of suitable samples. The percentage of acid used may vary but is preferably about 3% to 5% strength. The treatment is continued till the manganese dioxide is substantially all reduced, the time usually varying from four to eight hours according to conditions.

The solution and ore are separated by the usual methods and the manganous sulphate contained in the solution may be treated for recovery of the acid if the expense is warranted.

The treated ore, after neutralization, is sent on for treatment by the ordinary methods.

Our experiments show that by our preliminary treatment ores such as described are made amendable to cyanide treatment and that extractions of from 90% to 98% of the precious metals are readily attainable with a low cyanide consumption.

What we claim as our invention is:—

A process of treating gold or silver ores containing an oxide of manganese which consists in first treating the ore with metallic iron and sulphuric acid, separating the treated ore, and thereafter subjecting the ore to cyanidation.

Signed at Cobalt this 28th day of June 1921.

MATTHEW FRASER FAIRLIE.
JAMES JOHN DENNY.